United States Patent

[11] 3,602,813

| [72] | Inventor | Roy Fergus Benseman |
| | | 19 Scapa Terrace, Karori, |
| | | Wellington, New Zealand |
| [21] | Appl. No. | 708,363 |
| [22] | Filed | Feb. 26, 1968 |
| [45] | Patented | Aug. 31, 1971 |
| [32] | Priority | Mar. 2, 1967 |
| [33] | | New Zealand |
| [31] | | 148,019 |

[54] DEVICE INCLUDING AN ELECTROLYTIC BATH FOR ASCERTAINING THE AVERAGE TEMPERATURE OF A BODY OR SPACE AND PARTICULARLY FOODSTUFFS OVER A PERIOD OF TIME
1 Claim, 4 Drawing Figs.

[52] U.S. Cl. .................................................. 324/94,
73/358, 73/362 R, 204/1 T, 204/195, 324/29
[51] Int. Cl. ...................................................... G01n 27/42,
G01r 27/22
[50] Field of Search .......................................... 324/68, 94,
30; 204/52, 195, 1; 73/358, 362

[56] References Cited
UNITED STATES PATENTS
| 3,029,384 | 4/1962 | Hart | 324/94 X |
| 3,045,178 | 7/1962 | Corrsin | 324/94 X |
| 3,102,425 | 9/1963 | Westman et al. | 73/362 |
| 3,170,860 | 2/1965 | Morin, Jr. | 324/68 X |
| 3,186,228 | 6/1965 | Lever et al. | 324/68 X |
| 3,205,158 | 9/1965 | Renier | 73/358 X |
| 3,336,212 | 8/1967 | Nicholas et al. | 73/358 X |
| 3,344,343 | 9/1967 | John | 324/94 X |
| 3,119,754 | 1/1964 | Blumenfeld et al. | 324/94 X |
| 3,481,838 | 12/1969 | Berryhill | 324/94 X |

Primary Examiner—Gerard B. Strecker
Attorney—Holman & Stern

ABSTRACT: The finding of the average temperature of a body or space over a period of time in which a device having two electrodes immersed in an electrolytic bath is placed in the body or space and a current is passed from one electrode to the other for the time period for which it is desired to know the average temperature. The amount of metal transferred between the electrodes during such time period is determined and the average temperature during the time from the known relationship between the amount of metal transferred, the electrolytic bath, the length of time over which the current passes from one electrode to the other and the impressed e.m.f. is calculated.

PATENTED AUG 31 1971

DEVICE INCLUDING AN ELECTROLYTIC BATH FOR ASCERTAINING THE AVERAGE TEMPERATURE OF A BODY OR SPACE AND PARTICULARLY FOODSTUFFS OVER A PERIOD OF TIME

BACKGROUND OF THE INVENTION

This invention relates to methods of and means for finding an average temperature over a period of time.

In certain fields, for example, in the transport of foodstuffs, it is desirable to know the average temperature which has been encountered over a period of time, such as the temperature encountered by the foodstuffs during travel.

It is therefore an object of the present invention to provide means for and methods of finding an average temperature over a period of time which are simple yet effective in use of which will at least provide the public with a useful choice.

SUMMARY OF THE INVENTION

Accordingly, in one aspect, the invention consists in a method of finding the average temperature of a body or space over a period of time, comprising the steps of placing in the body or space where the average temperature known over a period of time is required to be known, a device having at least two electrodes immersed in a bath of electrolyte such as to deposit or remove metal on or from at least one of the electrodes on the passing of a current from one electrode to the other through the bath, passing such a current for the period of time during which it is required to know the average temperature, determining the amount of metal transferred between the electrodes after the use, and calculating the average temperature during the time from the known relationship between the amount of metal transferred, the nature of the electrolyte, the length of time over which the current has been applied and the impressed e.m.f.

In a further aspect, the invention consists in a device for use in finding average temperatures over a time, comprising at least two suitable electrodes separated by a suitable distance, a bath of electrolyte in which said electrodes are immersed and adapted on the passage of an electric current therethrough to deposit metal on or remove metal from at least one of said electrodes and terminals whereby an electric current may be applied to said electrodes for the purpose of depositing or removing metal from said electrolyte onto said electrodes, with the quantity of metal deposited or removed over a period of time being a function of the temperature in which the device operates so that weighing of the electrodes will give an indication of the average temperature which has operated for the time during which the current has flowed.

Preferably, said electrodes are of copper and said electrolyte is an electroplating bath comprising a dilute copper sulfate solution with said electrodes being disposed one at each end of a length of insulating tubing, e.g. of plastics material and the terminals being energized from a hearing aid battery of 1.40 v. nominal e.m.f.

One preferred form of the invention will now be described with reference to the accompanying drawings in which

DETAILED DESCRIPTION OF THE INVENTION

Figure 3:
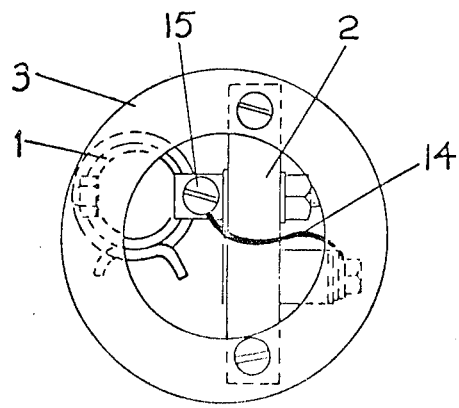
FIG. 3 is a plan view of FIG. 1.

Referring to the drawings, a device 1 for finding average temperatures over a time is mounted in a carrier comprising a platform 2 having ends 3 of circular form as may be seen in FIG. 3. A battery 4 such as a mercury battery, e.g. a hearing aid battery of 1.40 v. nominal open circuit e.m.f. is provided and a contact strip 5 connects one terminal of the battery to a terminal post 6 and a further contact strip 7 is connected to a terminal post 8 which in turn is connected by an integral stub 9 to one electrode 10 of the device 1. A second electrode 11 is also mounted on an integral stud 12 and a connection is made from the contact strip 5 to a terminal 13 and a short length of wire 14 (FIG. 3) to a further terminal screw 15 fixed to a terminal post 16. This arrangement is, of course, a purely preferred form and the electrical connections and mechanical carrying of the device 1 may be effected in any convenient manner.

Figure 1:
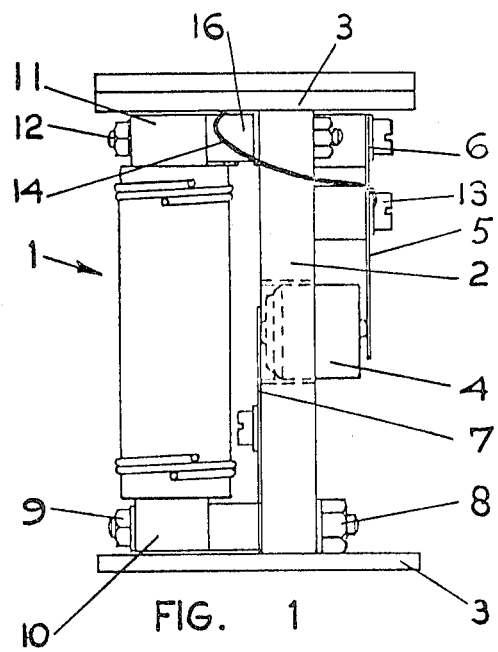
FIG. 1 is a front elevation of a device according to the present invention for finding average temperatures over a time carried in a mounting.
Figure 2:
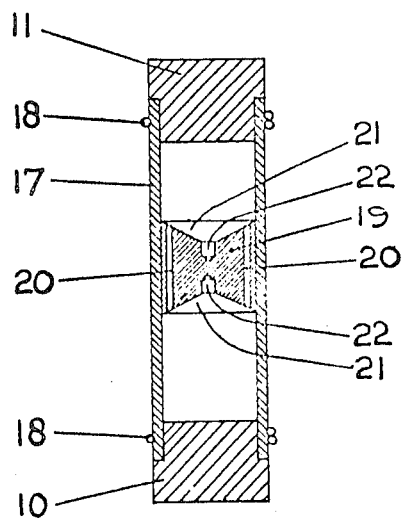
FIG. 2 is a longitudinal cross section of the device shown in FIG. 1.

Referring to FIG. 2, the device 1 is constructed from a short length, e.g. about 2¼ inches of one-half inch I.D. transparent plastics tubing material 17. The tubing 17 is detachably fixed to the copper electrodes 10 and 11 by wire ties 18, jubilee clips or any other suitable fixing means. The electrodes 10 and 11 have reduced diameters as shown to receive a suitable portion of the tubing 17. To assist in determining the useful life of the device, a passage way means is provided in the form of a plug 19 having passageways 20 therein and the cross-sectional area of these passageways determines the length of life of the device in use. Hence, a greater area of passageway would result in a shorter life than a smaller area of passageways 20.

In addition, the plug 19 contains depressions 21 and cavities 22 which form gas bubble traps to trap gas. The tube is filled or substantially filled with an electrolyte so that the electrodes are immersed therein and the electrolyte or electroplating bath containing copper ions preferably comprises a dilute copper sulfate solution, e.g. a solution of 200 grams of copper sulfate in 1 liter of water which is placed in the tube to act as the electrolyte or electroplating bath. The battery is connected with its positive terminal to the anode, and the cell is operated in an approximately vertical position and with the anode on top.

Electrodes are prepared by degreasing and pickling in nitric acid and provided it is reasonably clean, the state of the cathode is immaterial. The anode, however, must be scrupulously clean, particularly on its working face. Deep etching of the working face with nitric acid is recommended for newly made anodes to remove work hardened metal and reused anodes require only a light pickle. Cathodes can be reused without removing them from the plastic tube. The connections to the electrodes must be of a form to give good contact without the risk of accidentally removing metal from the electrode since removed metal could give a false weight figure.

After pickling and washing in water, the anode is quickly dried (with compressed air if desired) and weighed to an accuracy of $10^{14}$ or better. The assembly into a cell should then be carried out as soon as possible and it is permissible to handle with clean fingers all parts of anode except the working face.

A cathode is wired into one end of a piece of plastic tube containing a suitable plug, or these parts, already put together, may be available from a previous experiment. The cell is then placed open end upwardly in a suitable beaker filled with an electrolyte solution. The beaker is placed in a vacuum chamber which is then evacuated, with care being taken not to cause excessively vigorous boiling. After 2 or 3 minutes, the vacuum is released and the anode quickly inserted into the open end of the cell and properly wired. A few small bubbles are tolerable, preferably in the anode compartment but there must be no bubbles in or near the holes in the perspex plug. If the perspex plug is not wired and the anode is pushed straight into the plastic tube, the tube may bulge and allow the plug to shift.

After assembly, the exposed electrode surfaces are smeared with petroleum jelly to facilitate subsequent electrical contact.

The 1,40 v. mercury cell 4 is connected with the positive pole to the anode (top) and the negative pole to the cathode (bottom). As soon as these connections have been made and while they remain, the cell is operating.

The cell is set in operation and allowed to run for 24 hours (or some other known time of about 24 hours) at an exactly known temperature as near as possible to 20° C. The voltage developed across a 10.000-ohm resistor introduced into the circuit is measured to 1 part in 1000, as nearly as possible at the end of the 24-hour calibrating period. The current must not be interrupted for more than about 5 seconds when introducing the 10-ohm resistor.

At the end of the calibration period, current flow is stopped by breaking the circuit, and the unit is then ready for use.

Although the units can be made in many forms and using a wide range of plating solutions and metals, it has been found that copper electrodes and copper sulfate solutions are satisfactory. The temperature range of the units is limited by their freezing, and for this reason gylcerol has been added to increase the useful range by lowering the freezing point. Three solutions and their characteristics are listed below:

a. Stock solution diluted with an equal volume of water. (stock solution is 23.75 grams of $CuSO_4.5H_2O$ dissolved in 100 ml. of water) Limited —½° C. Conductance $2.57\times10^{12}$Mho/cm. at 20° C.

b. 50 percent by volume of stock solution. 20 percent by volume of glycerol, 30 percent by volume of water. Limit about −7° C. Conductance $1.28\times10^{12}$Mho/cm. at 20° C.

c. 50 percent by volume of glycerol, 30 percent by volume of water, 20 percent by volume of stock solution. Limit − 27° C. Conductance $1.48\times10^{13}$Mho/cm. at 20° C. Neglecting any contribution of polarization to cell resistance, for any particular solution the current flowing through a cell can be expressed as $$I=K(A+BT+CT^2+....)$$

where $A$, $B$, $C$, etc., are constants for a particular solution (more particularly the ratios between any of $A$, $B$, $C$, etc., are constant) and $K$ depends only on geometry (mainly size of plug holes). For solutions $(a)$ and $(b)$, the coefficient $C$ is for most purposes negligible and the plug hole diameter (and to some extent plug length) can be used to control cell current. This is easier than using many different electrolyte solutions for the same purpose.

Numbers of cells of the type described will be used by D.S,I.R. and other organizations during the coming fruit season to monitor temperatures during transport from the orchards to the markets. Operating periods will range from 48 hours to 12 weeks. Others will be suspended in fruit trees to indicate the average temperatures in which the fruit is grown.

The average temperatures in hot water cylinders and open pools of water have been monitored in this way. There are other potential uses for the units where long term temperature averages are required.

The principle is most easily understood if treated in three parts:

1. In electrolysis, 1 faraday of electricity (96,489 coulombs) liberates one chemical equivalent of an element from solution. Thus, in an electroplating bath, metal is removed from one electrode and deposited on the other in quantities determined exactly by the current flowing and the time for which it flows. For copper for example, 31.8 grams will be transferred by a current of one amp flowing for 96,489 seconds (or 96,489 amps flowing for 1 second). Thus for copper:

Grams deposited = (current × seconds) × (31.8)/96,489
i.e., Current = (grams deposited × (96,489)/31.8 × seconds)

Hence, if the time for which the current has been flowing and the mass of material deposited is known, the average current flowing during the period can be calculated.

2. The electrical resistance of common solutions used in plating baths is very nearly inversely proportional to their temperature. A typical set of values for copper sulfate solution is give below:

| temperature | resistance |
|---|---|
| °F. | ohms |
| 33 | 8530 |
| 60 | 5530 |
| 90 | 4100 |

Figure 4:
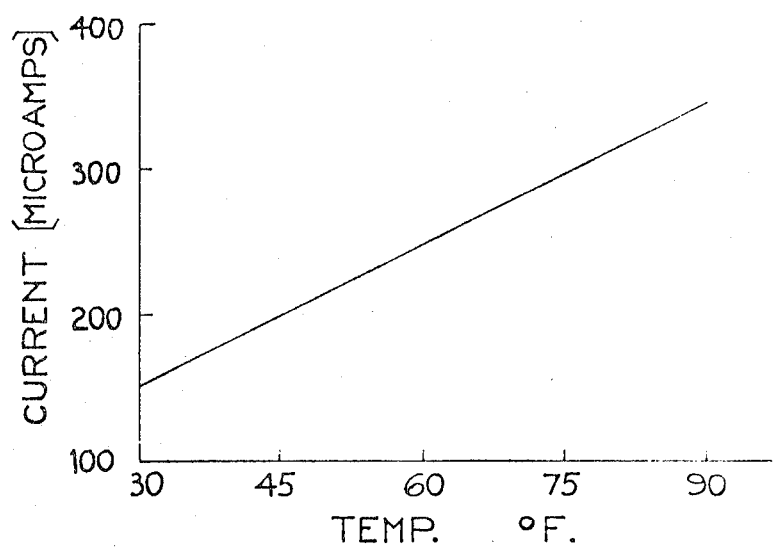
FIG. 4 is a graph of current temperature relationship.

3. If now a constant voltage source (a hearing aid battery is suitable) is attached to the electrodes, the current flowing is proportional to the temperature and a substantially linear relationship between temperature and current is obtained (See FIG. 4).

The use of the units should now be clear. A hearing aid battery is connected across a plating bath made up from a few inches of plastic tubing filled with copper sulfate solution with a copper rod forming the electrodes at the ends of the tube. The unit is placed in the environment to be monitored and the time noted. At some known later time the unit is disconnected and the weight change of either electrode is measured. Reference is then made to the second equation in section 1 and the average current during the test is calculated. Direct reference to the calibration curve (FIG. 4) then gives the average temperature of the environment during the test period.

Regarding the methods of determining the quantities of metal moved from anode to cathode, there is envisaged only four practical method.

1. Direct weighing before and after use of the anode or cathode, or both.
2. Reversing the direction of current flow after the unit has been used and "back plating" until the unit returns to its original state. The integrated current to do this would be equal to that passed during the actual operation of the cell.

There has been some success by plating copper onto a carbon electrode and then deplating until a sudden rise of resistance of the circuit shows that all the copper has been removed. It is the recognition of this "end point" that determines the usefulness of this technique as a practical method for estimating the copper transferred.

3. Measuring the change in the center of gravity of the cell as a result of copper being transferred from electrode to another. There are several ways this can be done, e.g. observing the period of pendulum whose bob is the integrating unit. The period would be measured before and after use and the change (taken in conjunction with the geometry of the system) would indicate the quantity of copper moved.
4. Copper transfer may be measured visually by making the anode in the form of a wedge, with the quantity of metal removed being a function of the remaining length of wedge.

What we claim is:

1. A device for use in ascertaining the average temperature of a body or space over a period of time, comprising a hollow tubular body of transparent plastic material, said body having open ends, an electrode closing each open end and extending within the body with the electrodes being arranged in axially spaced relationship, a plug mounted within the tubular body between the electrodes, said plug having passageways extending therethrough, the cross-sectional area of the passageways determining the life of the device in use, each end of the plug being provided with a depression and a cavity defining gas bubble traps, an electrolytic bath within said body within which at least a part of each electrode is immersed for depositing or removing metal on or from at least one of the electrodes upon the passage of a current from one electrode to the other electrode through the bath, and means operably related with said electrodes for passing an electric current to the electrodes for a time period during which it is required to know the average temperature in which the device operates whereby the transfer of metal between the electrodes gives an indication of the average temperature which is operated for the time during which the current has passed.